(12) United States Patent
Uchiyama et al.

(10) Patent No.: US 10,612,445 B2
(45) Date of Patent: Apr. 7, 2020

(54) DIAGNOSTIC DEVICE AND SENSOR

(71) Applicant: ISUZU MOTORS LIMITED, Tokyo (JP)

(72) Inventors: Tadashi Uchiyama, Kamakura (JP); Satoshi Hanawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 186 days.

(21) Appl. No.: 15/531,398

(22) PCT Filed: Nov. 17, 2015

(86) PCT No.: PCT/JP2015/082300
§ 371 (c)(1),
(2) Date: May 26, 2017

(87) PCT Pub. No.: WO2016/084660
PCT Pub. Date: Jun. 2, 2016

(65) Prior Publication Data
US 2017/0328259 A1 Nov. 16, 2017

(30) Foreign Application Priority Data
Nov. 26, 2014 (JP) .................................. 2014-238946

(51) Int. Cl.
*F01N 11/00* (2006.01)
*F01N 3/023* (2006.01)
(Continued)

(52) U.S. Cl.
CPC ................ *F01N 11/00* (2013.01); *F01N 3/00* (2013.01); *F01N 3/021* (2013.01); *F01N 3/023* (2013.01);
(Continued)

(58) Field of Classification Search
CPC ............. F01N 11/00; F01N 2900/0416; F01N 2900/0418; F01N 2900/08; F01N 3/023; F01N 3/18
See application file for complete search history.

(56) References Cited

U.S. PATENT DOCUMENTS

2011/0320171 A1* 12/2011 Okayama ........... B01D 46/0086
702/183
2012/0085146 A1    4/2012 Maeda et al.
(Continued)

FOREIGN PATENT DOCUMENTS

CN    102695854 A    9/2012
CN    103339363 A    10/2013
(Continued)

OTHER PUBLICATIONS

Extended European Search Report for EP App No. 15864186.0 dated Mar. 23, 2018, 6 pgs.
(Continued)

*Primary Examiner* — Audrey K Bradley
*Assistant Examiner* — Anthony Ayala Delgado
(74) *Attorney, Agent, or Firm* — Procopio, Cory, Hargreaves & Savitch LLP (57) ABSTRACT

There is provided the diagnostic device for a sensor which is arranged in an exhaust passage of an internal combustion engine and detects a particulate matter amount in exhaust, the diagnostic device including a time-rate-of-change calculation unit which calculates a time rate of change of the particulate matter amount detected by the sensor during a period in which a fuel injection amount of the internal combustion engine is equal to or less than a predetermined injection amount threshold, and an abnormality determination unit which determines an abnormality of the sensor based on the time rate of change of the particulate matter amount calculated by the time-rate-of-change calculation unit.

5 Claims, 5 Drawing Sheets (51) Int. Cl.
F02D 45/00 (2006.01)
F01N 3/00 (2006.01)
G01N 15/06 (2006.01)
F01N 3/18 (2006.01)
F01N 3/021 (2006.01)
F01N 13/00 (2010.01)
G01N 27/22 (2006.01)

(52) U.S. Cl.
CPC ............. *F01N 3/18* (2013.01); *F01N 13/008* (2013.01); *F02D 45/00* (2013.01); *G01N 15/06* (2013.01); *F01N 2560/05* (2013.01); *F01N 2900/0416* (2013.01); *F01N 2900/0418* (2013.01); *F01N 2900/08* (2013.01); *G01N 27/221* (2013.01); *Y02T 10/20* (2013.01); *Y02T 10/47* (2013.01)

(56) References Cited

U.S. PATENT DOCUMENTS

| | | | |
|---|---|---|---|
| 2012/0260636 A1 | 10/2012 | Hashida et al. | |
| 2012/0324841 A1 | 12/2012 | Nishijima | |
| 2013/0298534 A1 | 11/2013 | Yahata et al. | |
| 2013/0298535 A1 | 11/2013 | Aoki | |
| 2013/0304359 A1 | 11/2013 | Yahata et al. | |
| 2016/0040572 A1 | 2/2016 | Uchiyama et al. | |
| 2017/0051650 A1* | 2/2017 | Nakata | F01N 3/023 |

FOREIGN PATENT DOCUMENTS

| | | |
|---|---|---|
| JP | 2009-144512 A | 7/2009 |
| JP | 2010-275977 A | 12/2010 |
| JP | 2012036816 A | 2/2012 |
| JP | 2012-083210 A | 4/2012 |
| JP | 2013-234643 A | 11/2013 |
| JP | 2014-059218 A | 4/2014 |
| JP | 2014-167274 A | 9/2014 |
| WO | 2012114518 A1 | 8/2012 |
| WO | 2016047529 A1 | 3/2016 |

OTHER PUBLICATIONS

International Search Report and Written Opinion for PCT App No. PCT/JP2015/082300 dated Feb. 16, 2016, 9 pgs.

First Office Action for related CN App No. 201580064366.8 dated Sep. 12, 2018, 14 pgs.

* cited by examiner

DIAGNOSTIC DEVICE AND SENSOR

CROSS-REFERENCE TO RELATED APPLICATIONS

This application is a U.S. National Stage entry of PCT Application No. PCT/JP2015/082300, filed on Nov. 17, 2015, which claims priority to Japanese Patent Application No. 2014-238946, filed Nov. 26, 2014, the contents of which are incorporated herein by reference.

TECHNICAL FIELD

The present invention relates to a diagnostic device and a sensor, particularly to a diagnostic device for a particulate matter (hereinafter referred to as "PM") sensor which detects PM in exhaust and a PM sensor.

BACKGROUND ART

An electric resistance-type PM sensor is conventionally known as a sensor for detecting PM in exhaust discharged from an internal combustion engine. In the electric resistance-type PM sensor, a pair of conductive electrodes is arranged opposite to each other on a surface of an insulating substrate. A PM amount is estimated based on the fact that the electric resistance value changes with the conductive PM (mainly soot ingredients) adhering to the electrodes (e.g., see Patent Document 1).

A failure diagnostic device of the electric resistance-type PM sensor is proposed, which compares regeneration times of two PM sensors and determines a failure when a difference between the regeneration times of the two PM sensors is greater than a predetermined value (e.g., see Patent Document 2).

PRIOR ART DOCUMENT

Patent Document

Patent Document 1: JP-A-2012-83210
Patent Document 2: JP-A-2009-144512

SUMMARY OF THE INVENTION

Problems to be Solved by the Invention

However, in the device of Patent Document 2, since it is necessary to provide two PM sensors at substantially a same position, there is a problem that it is wasteful and cost increases.

Furthermore, in the diagnostic device of Patent Document 2, since the diagnosis cannot be performed unless the sensor regeneration is performed, there is a possibility that functional failure, functional deterioration or the like of the PM sensor cannot be detected early when the frequency of the sensor regeneration is low.

In order to solve the above problems, an object of the present invention is to provide a low cost diagnostic device and a sensor capable of detecting functional failure or deterioration of a PM sensor early.

Means for Solving the Problem

The present invention aims to achieve the above object, and provides a diagnostic device for a sensor which is arranged in an exhaust passage of an internal combustion engine and detects a particulate matter amount in exhaust, the diagnostic device including: a time-rate-of-change calculation unit which calculates a time rate of change of the particulate matter amount detected by the sensor during a period in which a fuel injection amount of the internal combustion engine is equal to or less than a predetermined injection amount threshold; and an abnormality determination unit which determines an abnormality of the sensor based on the time rate of change of the particulate matter amount calculated by the time-rate-of-change calculation unit.

DESCRIPTION OF EMBODIMENTS

A diagnostic device according to an embodiment of the present invention will be described hereinafter with reference to the appended drawings. Same components are given same reference numerals, and their names and functions are same as well. Therefore, detailed descriptions of such components are not repeated.

Figure 1:
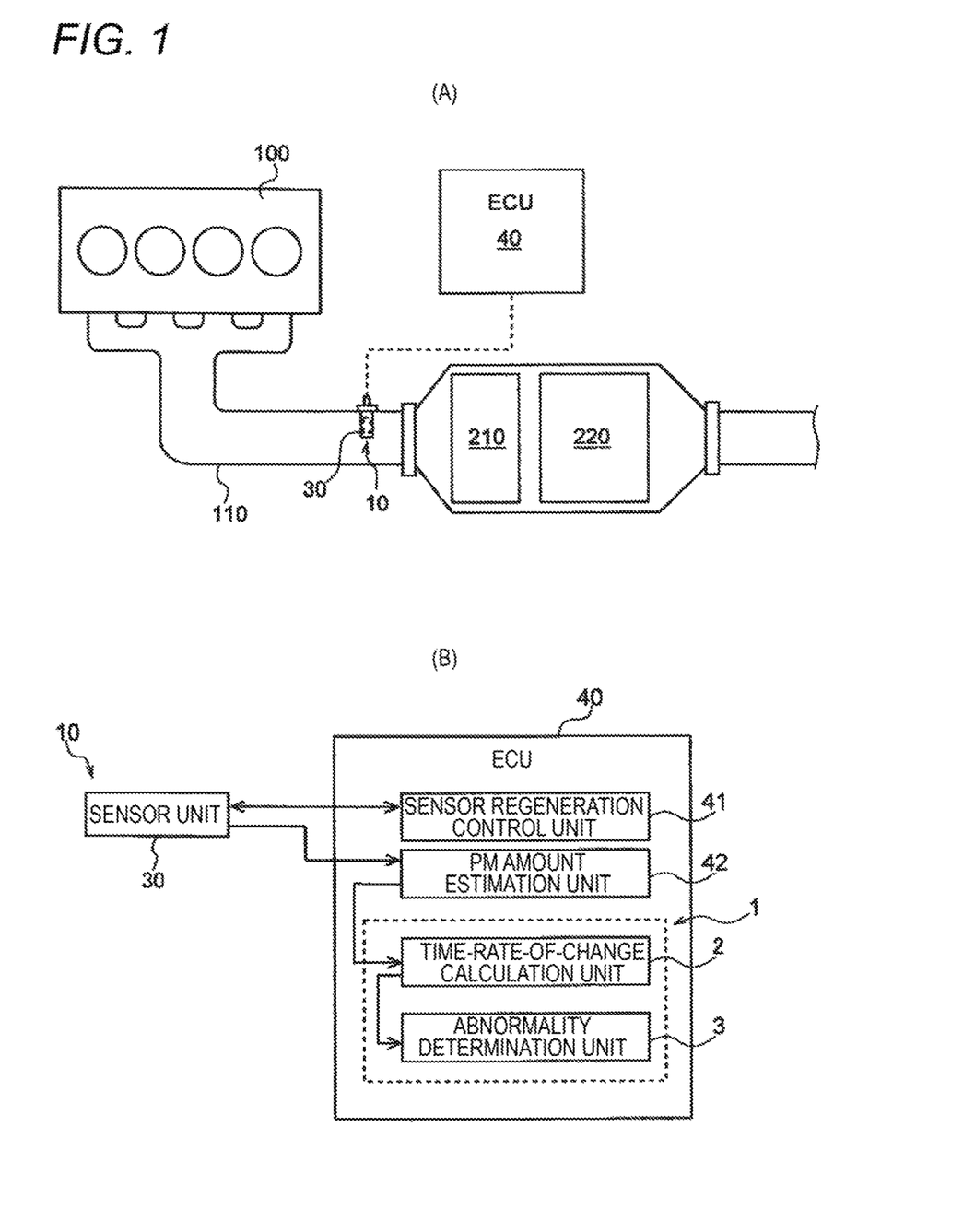
FIG. 1(A) is a schematic configuration diagram showing an example of an exhaust system of a diesel engine to which a diagnostic device according to an embodiment of the present invention is applied.
FIG. 1(B) is a functional block diagram of an electronic control unit.

FIG. 1(A) is a schematic configuration diagram showing an example of an exhaust system of a diesel engine (hereinafter simply referred to as "engine") to which the diagnostic device according to this embodiment is applied, and FIG. 1(B) is a functional block diagram of an electronic control unit.

As shown in FIG. 1(A), an oxidation catalyst 210, a particulate filter (hereinafter referred to as "DPF") 220, etc., are sequentially provided in an exhaust passage (exhaust pipe) 110 of the engine 100 from an exhaust upstream side. In the diagnostic device according to this embodiment, a PM sensor 10 is arranged on the exhaust upstream side of the DPF 220 in the exhaust passage 110. The number of the PM sensor 10 is not limited and may be two or more. In addition, the PM sensor 10 may be arranged in an exhaust downstream side of the DPF 220 in the exhaust passage 110.

Figure 2:
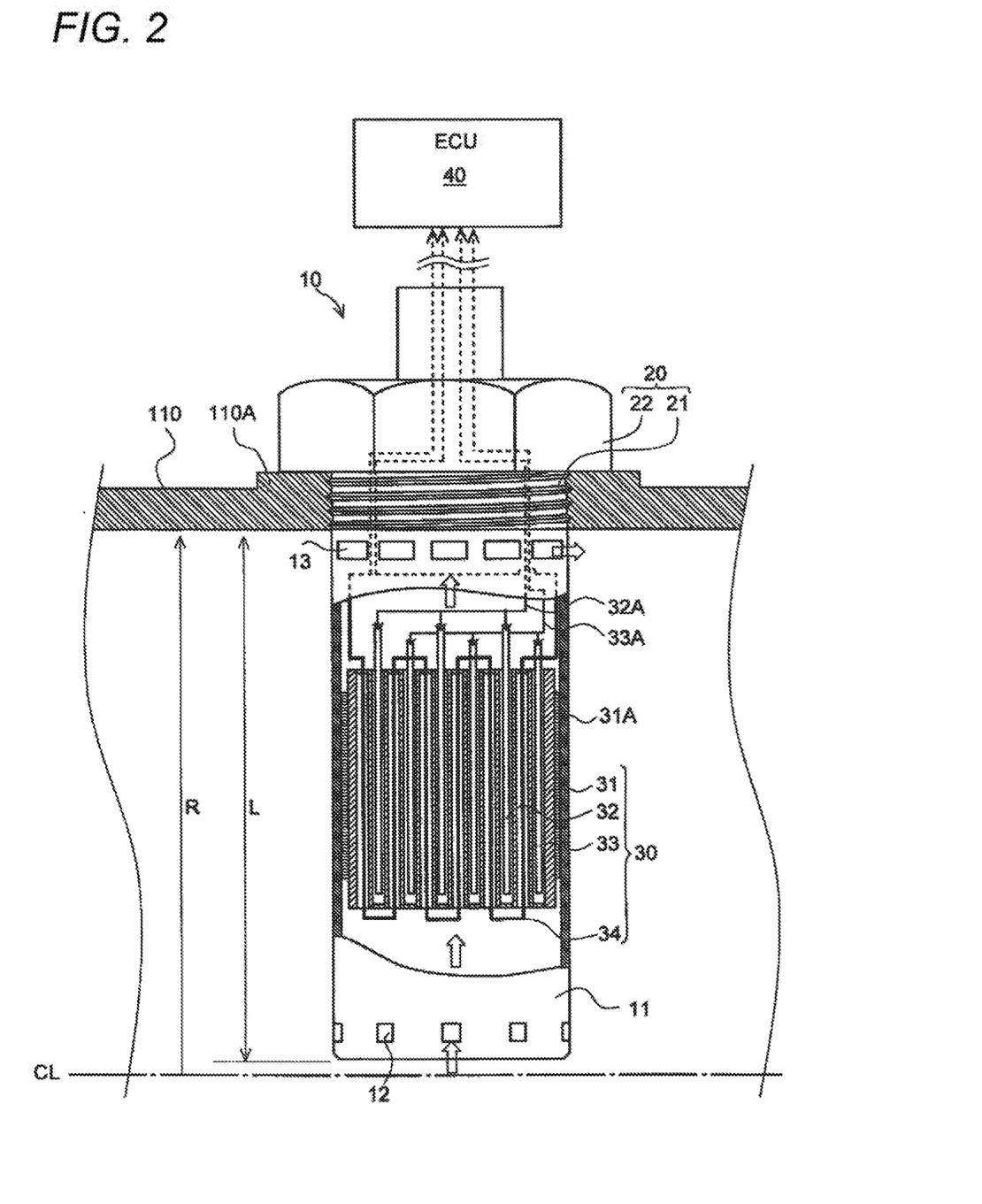
FIG. 2 is a schematic partial sectional view showing a PM sensor of the diagnostic device according to an embodiment of the present invention.

The detailed configuration of the PM sensor 10 will be described as below.

As shown in FIG. 2, the PM sensor 10 includes a case member 11 which is inserted in the exhaust passage 110, a pedestal 20 through by the case member 11 is installed into the exhaust passage 110, and a sensor unit 30 which is accommodated in the case member 11.

The case member 11 is a cylinder with a closed bottom side (the lower side in the figure). A length L of the case member 11 in an axial direction of the cylinder is substantially the same as a radius R of the exhaust passage 110, such that a cylinder wall portion at the bottom side protrudes proximately to a center line CL of the exhaust passage 110. In the following description, the bottom side of the case member 11 is described as a top-end side and the side opposite to the bottom side is described as a base-end side.

A plurality of inlets 12 are spaced at intervals in a circumferential direction on the cylinder wall portion at the top-end side of the case member 11. A plurality of outlets 13 are spaced at intervals in the circumferential direction on the cylinder wall portion at the base-end side of the case member 11. The total opening area $S_{12}$ of the inlets 12 is less than the total opening area $S_{13}$ of the outlets 13 ($S_{12}<S_{13}$). In other words, since exhaust flow velocity $V_{12}$ near the inlets 12 is less than exhaust flow velocity $V_{13}$ near the outlets 13 ($V_{12}<V_{13}$), the pressure $P_{12}$ at the inlets 12 is higher than pressure $P_{13}$ at the outlets 13 ($P_{12}>P_{13}$). Therefore, exhaust gas flows into the case member 11 smoothly from the inlets 12 while the exhaust gas in the case member 11 flows into the exhaust passage 110 smoothly from the outlets 13.

The pedestal 20 includes a male-thread part 21 and a nut part 22. The male-thread part 21 at the base end of the case member 11 closes the opening of the case member 11 at the base-end side. The male-thread part 21 is screwed with a female-thread part of a boss 110A formed to the exhaust passage 110. The nut part 22 is, for example, a hexagon nut and is fixed to an upper end of the male-thread part 21. Penetration holes (not shown), through which conductive wires 32A, 33A or the like described later are inserted, are formed to the male-thread part 21 and the nut part 22.

The sensor unit 30 includes a filter member 31, a plurality of pairs of electrodes 32, 33, and an electric heater 34.

The filter member 31 is, for example, formed by alternately sealing upstream and downstream sides of a plurality of cells which form a grid-like exhaust flow path divided by porous ceramic partition walls. The filter member 31 is held on an inner circumferential surface of the case member 11 through a cushion member 31A in a state where the direction of flow path of the cells is substantially parallel to the axial direction (upper-lower direction in the figure) of the case member 11. PM in the exhaust gas flowing into the case member 11 from the inlets 12 is collected on partition wall surfaces or pores by making the exhaust gas flow into the cells with sealed upstream sides from the cells with sealed downstream sides. In the following, the cells with sealed upstream sides will be described as cells for measurement and the cells with sealed downstream sides will be described as cells for electrode.

The electrodes 32, 33 are, for example, conductive metal wires, and are alternately inserted into the cells for electrode opposite from the downstream side (unsealed side) to form a capacitor with the cell for measurement interposed therebetween. Through the conductive wires 32A, 33A, the electrodes 32, 33 are respectively connected to a capacitance detection circuit, which is not shown and built in an electronic control unit (referred to as "ECU") 40 of a vehicle.

The electric heater 34 is, for example, a heating wire and configures the regeneration means of the present invention. The electric heater 34 burns and removes the PM accumulated in the cells for measurement, i.e. performs the so-called filter regeneration (hereinafter referred to as "sensor regeneration"), by being energized to heat the cells for measurement. Thus, the electric heater 34 is bent into a continuous S shape and has its parallel line parts separately inserted into the cells for measurement along the flow path.

As shown in FIG. 1(B), the PM sensor 10 includes a sensor regeneration control unit 41 and a PM amount estimation unit 42. The sensor regeneration control unit 41 and the PM amount estimation unit 42 are mounted in the ECU 40. Here, the sensor regeneration control unit 41 and the PM amount estimation unit 42 may be mounted in a hardware unit separate from the ECU 40.

The sensor regeneration control unit 41 performs the sensor regeneration in which the electric heater 34 is turned on (energized) in accordance with capacitance Cp between the electrodes 32, 33 detected by the capacitance detection circuit not shown. The capacitance Cp between the electrodes 32, 33, dielectric constant ε of a medium between the electrodes 32, 33, surface area S of the electrodes 32, 33, and distance d between the electrodes 32, 33 have a relationship represented by the following Equation 1.

$$Cp = \sum \left(\varepsilon * \frac{S}{d}\right) \qquad \text{[Equation 1]}$$

In Equation 1, the surface area S of the electrodes 32, 33 is constant. When the PM is collected on the filter member 31, the dielectric constant ε and the distance d change, and the capacitance Cp changes accordingly. That is, a proportional relationship is established between the capacitance Cp between the electrodes 32, 33 and the PM accumulation amount on the filter member 31.

Figure 3:
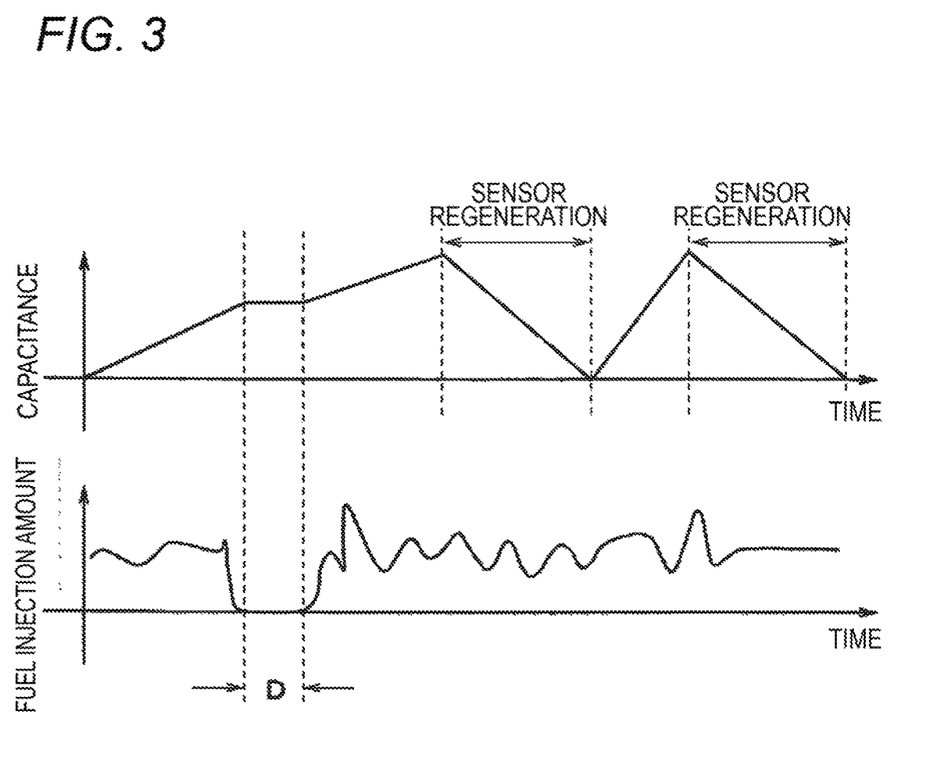
FIG. 3 illustrates the principle of the diagnostic device according to the present invention.

The sensor regeneration control unit 41 starts the sensor regeneration, i.e. turns on the electric heater 34, when the capacitance Cp between the electrodes 32, 33 reaches a predetermined capacitance maximum threshold $C_{P\_max}$ indicating a maximum PM accumulation amount on the filter member 31 (see FIG. 3). The sensor regeneration continues until the capacitance Cp becomes lower than a predetermined capacitance minimum threshold $C_{P\_min}$ indicating a complete removal of PM.

The PM amount estimation unit 42 is an example of the estimation means according to the present invention. The PM amount estimation unit calculates the capacitance Cp between the electrodes 32, 33 and estimates a total PM amount $m_{PM\_sum}$ in the exhaust, based on a capacitance change amount $\Delta Cp_n$ during a measurement target period.

A PM amount $m_{PM\_n}$ collected by the filter member 31 during an arbitrary period $T_n$ is obtained by the following Equation 2 in which the capacitance change amount $\Delta Cp_n$ is multiplied by a first order coefficient β.

$$m_{PM\_n} = \beta \cdot \Delta Cp_n \qquad \text{[Equation 2]}$$

The PM amount estimation unit 42 calculates the total PM amount $m_{PM\_sum}$ in the exhaust gas flowing into the filter member 31 of the PM sensor 10 in real time based on the following Equation 3 in which the PM amounts $m_{PM\_n}$ during periods $T_n$ calculated from Equation 2 are sequentially added up.

$$m_{PM\_sum} = \beta \cdot \Delta Cp_i + \beta \cdot \Delta Cp_2 + \ldots + \beta \cdot \Delta Cp_n = \beta \cdot \sum_{T=i}^{n} \Delta Cp_T \qquad \text{[Equation 3]}$$

The PM sensor 10 further includes a diagnostic device 1 according to this embodiment.

The diagnostic device 1 includes a time-rate-of-change calculation unit 2 and an abnormality determination unit 3.

The time-rate-of-change calculation unit 2 and the abnormality determination unit 3 are mounted in the ECU 40 of the vehicle. Here, the time-rate-of-change calculation unit 2 and the abnormality determination unit 3 may be mounted in a hardware unit separate from the ECU 40.

The time-rate-of-change calculation unit 2 calculates a time rate of change of a PM amount detected by the PM sensor 10 during a period in which a fuel injection amount of the engine 100, i.e. the internal combustion engine, is equal to or less than a predetermined injection amount threshold. Since the fuel injection amount is used for engine control or the like in the ECU 40, the time-rate-of-change calculation unit 2 may be configured to obtain the fuel injection amount used in the ECU 40 for calculation.

It is preferable that the injection amount threshold is set to a small value at which PM is hardly generated from the engine 100. Here, the injection amount threshold is 0, and the time-rate-of-change calculation unit 2 is configured to calculate the time rate of change of the PM amount detected by the PM sensor 10 at a fuel cut time when the fuel injection amount is 0.

The abnormality determination unit 3 determines the abnormality of the PM sensor 10 based on the time rate of change of the PM amount calculated by the time-rate-of-change calculation unit 2.

As shown in FIG. 3, since the engine 100 hardly discharges PM during a period D in which the fuel injection amount is equal to or less than the injection amount threshold (herein, at the fuel cut time when the fuel injection amount is 0), the capacitance Cp during the period D hardly changes and the time rate of change of the PM amount should be approximately 0 when the PM sensor 10 is normal. Therefore, the PM sensor 10 is considered to be abnormal in a case where the time rate of change of the PM amount during the period D increases.

Herein, the PM amount refers to the PM amount collected by the filter member 31 at the time of measurement and can be represented by the total PM amount $m_{PM\_sum}$ after the previous sensor regeneration. Since the change amount of the total PM amount $m_{P\_sum}$ depends on the change amount of the capacitance Cp between the electrodes 32, 33, the time rate of change of the capacitance Cp (dCp/dt) is used as an index showing the time rate of change of the PM amount to simplify calculation in this embodiment.

In this embodiment, the time-rate-of-change calculation unit 2 is configured to calculate the time rate of change of the capacitance Cp (dCp/dt) at the fuel cut time and the abnormality determination unit 3 is configured to determine abnormality of the PM sensor 10 based on the time rate of change of the capacitance Cp (dCp/dt).

Further, since the capacitance Cp changes with exhaust gas temperature, the determination accuracy can be further improved by correcting the measured capacitance Cp based on the exhaust gas temperature.

In this embodiment, the diagnostic device 1 further includes exhaust-gas-temperature detection means (not shown) for detecting exhaust gas temperature. The abnormality determination unit 3 is configured to determine the abnormality of the PM sensor 10 by comparing value A represented by the following expression with a predetermined change-of-rate threshold, the value A being obtained by correcting the time rate of change of the capacitance Cp (dCp/dt) based on the exhaust gas temperature T detected by the exhaust-gas-temperature detection means, $$A = (dCp/dt) \times f(T)$$

wherein, f(T) is a correction coefficient of the exhaust gas temperature T.

More specifically, the abnormality determination unit 3 determines that the PM sensor 10 is abnormal when the value A is greater than the change-of-rate threshold and determines that the PM sensor 10 is normal when the value A is equal to or less than the change-of-rate threshold. The correction coefficient f(T), for example, may be obtained with reference to a correction coefficient map, with respect to the exhaust gas temperature T, installed in advance in the ECU 40.

Since the exhaust gas temperature is measured by a temperature sensor (not shown) provided in the exhaust passage 110 and used for regeneration control of the DPF 220 or the like, the temperature sensor may be used as the exhaust-gas-temperature detection means.

Effects of this embodiment will be described.

The diagnostic device 1 according to this embodiment includes: the time-rate-of-change calculation unit 2 which calculates the time rate of change of the PM amount detected by the PM sensor 10 during a period in which the fuel injection amount of the engine 100, i.e. the internal combustion engine, is equal to or less than the predetermined injection amount threshold; and the abnormality determination unit 3 which determines the abnormality of the PM sensor 10 based on the time rate of change of the PM amount calculated by the time-rate-of-change calculation unit 2.

In the related art in which output values of two electric resistance-type PM sensors are compared with each other, since it is necessary to provide two same PM sensors at substantially the same position, cost increases. In addition, there is a possibility that functional failure, functional deterioration or the like of the PM sensor cannot be detected early when the frequency of the sensor regeneration is low.

In contrast, the diagnostic device 1 according to this embodiment uses the fact that the PM is hardly generated during a period in which the fuel injection amount is small (preferably at the fuel cut time), and is configured to determine that the PM sensor 10 is abnormal in a case where the time rate of change of the PM amount is large during this period.

Therefore, it is unnecessary to provide a plurality of PM sensors 10 at the same position to diagnose the PM sensors 10, and the cost becomes lower. Further, abnormality determination of the PM sensor 10 can be performed every time when the fuel injection amount decreases, such as during decelerating, running downhill, or running by inertia, so that abnormality determination frequency of the PM sensor 10 is increased. Thereby, functional failure, functional deterioration or the like of the PM sensor 10 can be detected early compared with the related art.

The PM sensor 10 according to this embodiment is a capacitive-type sensor in which at least one pair of electrodes 32, 33, which is arranged opposite to each other with the cell for collecting the particulate matter in the exhaust being interposed therebetween to form a capacitor, is provided in the filter member 31 arranged in the exhaust passage 110 and including the cell, and includes estimation means for estimating the PM amount in the exhaust based on the capacitance Cp between the pair of electrodes 32, 33.

Since the electric resistance value shows no change until the electrodes are connected to each other through the PM, it is difficult to estimate the PM amount in the exhaust gas in real time in the electric resistance-type PM sensor that estimates the PM amount based on the electric resistance value between the electrodes.

In contrast, the PM sensor 10 according to this embodiment is configured to estimate the PM amount based on the capacitance change amount between the electrodes 32, 33 with good sensitivity, and calculate the PM amount in the exhaust gas by sequentially adding up the estimated PM amount. Thus, according to the PM sensor 10 in this embodiment, the PM amount in the exhaust gas discharged from the engine 100 can be estimated with high accuracy and in real time.

In the electric resistance-type sensor with the PM adhering to each electrode, for example, there is a possibility that the PM is partially removed from the electrodes in an operation state where the exhaust flow amount increases, and thus it is difficult to ensure the estimation accuracy of the PM amount. In contrast, the PM sensor 10 according to this embodiment is configured to reliably collect the PM in the exhaust gas by the filter member 31. Thus, according to the PM sensor 10 in this embodiment, the estimation accuracy of the PM amount can be effectively ensured even in the operation state where the exhaust flow amount increases.

Further, in the PM sensor 10 according to this embodiment, the top end of the case member 11 accommodating the sensor unit 30 protrudes proximately to the center line CL at which a velocity of exhaust flow is the greatest in the exhaust passage 110. The inlets 12, through which the exhaust gas flows into the case member 11, are provided at the cylinder wall portion the top-end side of the case member 11. In addition, the outlets 13, whose opening area is larger than that of the inlets 12, are provided at the cylinder wall portion at the base-end side of the case member 11. That is, according to the PM sensor 10 in this embodiment, a large difference in the static pressure between the inlets 12 and the outlets 13 can be ensured by arranging the inlets 12 proximate to the center line CL of the exhaust passage 110 at which the velocity of the exhaust flow is the greatest and enlarging the opening area of the outlets 13, thereby facilitating the flow of exhaust gas through the sensor unit 30.

The present invention is not limited to the above embodiment, and various modifications may be made without departing from the spirit and scope of the present invention.

Figure 4:
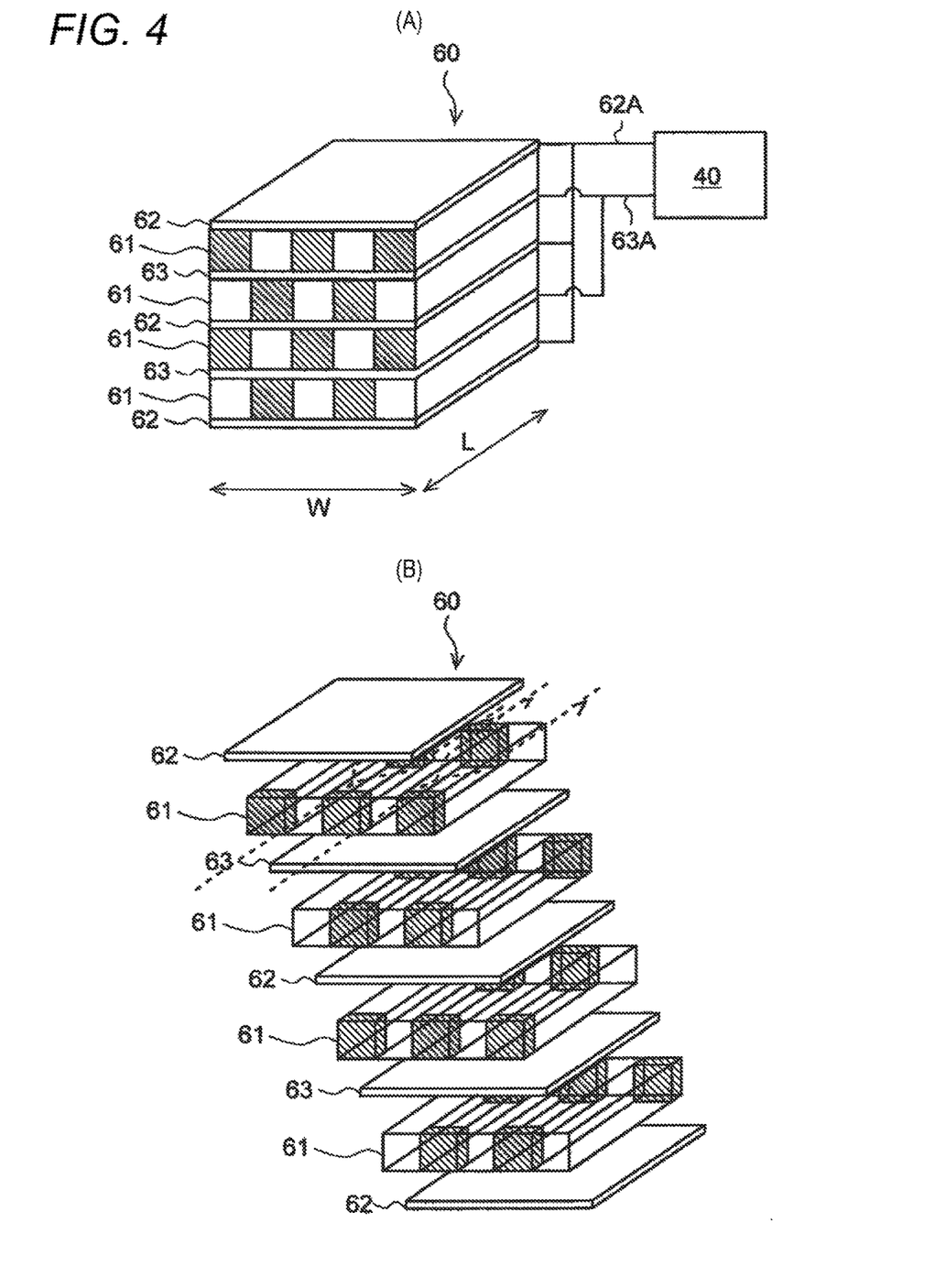
FIG. 4(A) is a schematic perspective view showing a sensor unit of a PM sensor according to a modification of the present invention.
FIG. 4(B) is a schematic exploded perspective view showing the sensor unit of the PM sensor.

For example, the detailed configuration of the PM sensor 10 is not limited to the above embodiment and a laminated sensor unit 60 as shown in FIGS. 4(A) and (B) may be used.

The sensor unit 60 includes a plurality of cuboid filter layers 61 in which cells, with upstream sides and downstream sides alternately sealed, are arranged in parallel along one direction, and a plurality of first and second electrode plates 62, 63 which are composed of flat conductive members, and is configured by alternately stacking the first and second electrode plates 62, 63 with a filter layer 61 interposed therebetween. The length L and width W of the first and second electrode plates 62, 63 are substantially the same as those of the filter layers 61.

The electrode surface area S can be effectively ensured by arranging a first electrode plate 62 and a second electrode plate 63 opposite to each other and interposing a filter layer 61 between the first electrode plate 62 and the second electrode plate 63. Thereby, an absolute value of the detectable capacitance can be increased. Further, since the distance d between the electrodes is the cell pitch and is uniformed, variation of initial capacitance can be effectively suppressed.

Voltage may be applied to the electrode plates 62, 63 directly, or a heater substrate or the like not shown may be provided between the filter layer 61 and the electrode plates 62, 63 when burning and removing the PM accumulated on the cells.

Figure 5:
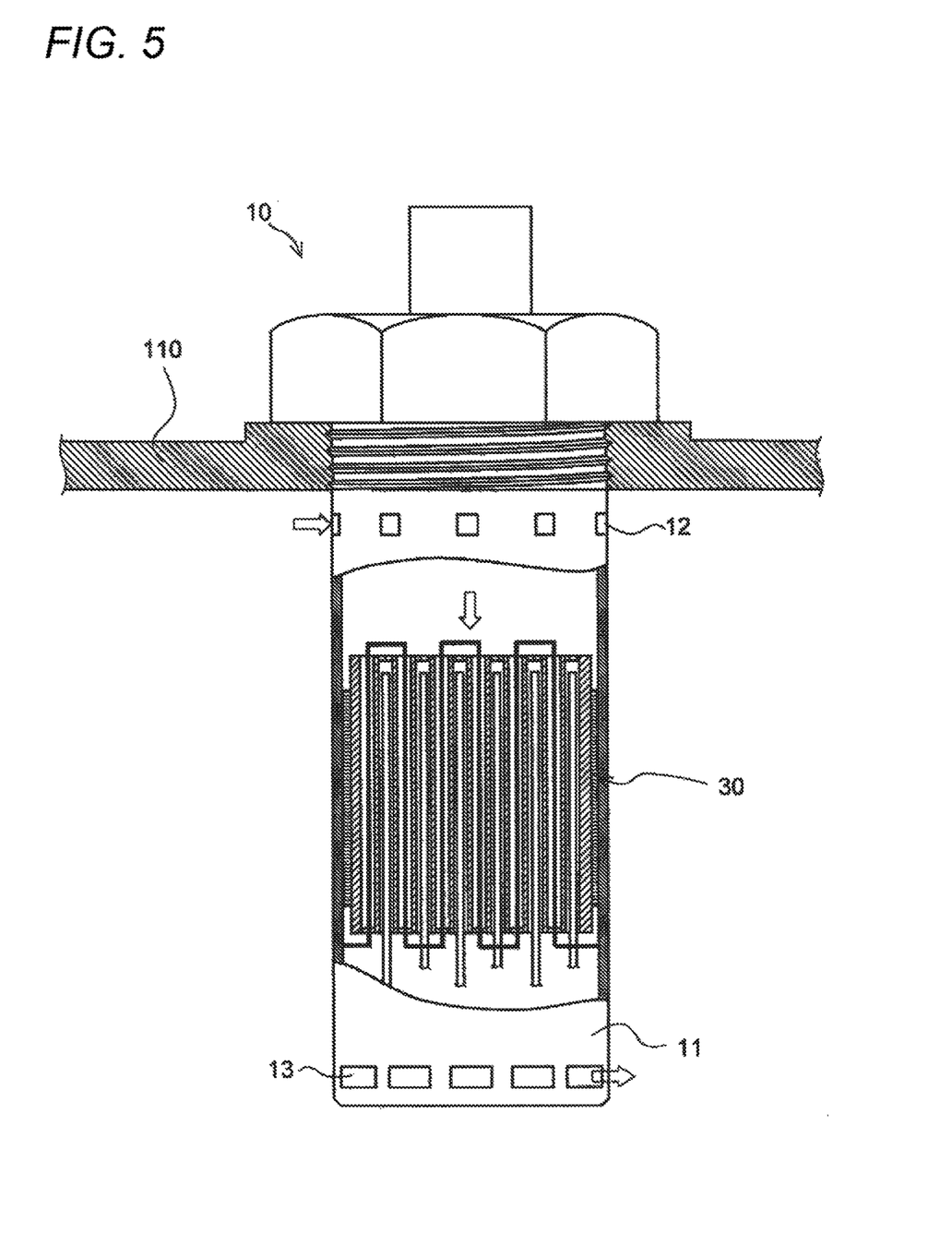
FIG. 5 is a schematic partial sectional view showing a PM sensor according to a modification of the present invention.

Further, as shown in FIG. 5, positions of the inlets 12 and the outlets 13 may be reversed, such that the exhaust gas flows into the case member 11 in a reverse direction. In this case, the filter member 31 may be accommodated reversely in the case member 11.

The invention claimed is:

1. A control system comprising:
   a sensor which is arranged in an exhaust passage of an internal combustion engine and detects a particulate matter amount in exhaust; and
   a diagnostic device for diagnosing the sensor,
   the diagnostic device configured to:
   calculate a time rate of change of the particulate matter amount detected by the sensor during a period in which a fuel injection amount of the internal combustion engine is equal to or less than a predetermined injection amount threshold;
   determine an abnormality of the sensor based on the time rate of change of the particulate matter amount; and
   detect at least one of a functional failure and a functional deterioration in response to the determination of the abnormality.

2. The control system according to claim 1,
   wherein the sensor is a capacitive-type sensor in which at least one pair of electrodes, which is arranged opposite to each other with a cell for collecting the particulate matter in the exhaust being interposed therebetween to form a capacitor, is provided in a filter member arranged in the exhaust passage and including the cell, and includes a controller that estimates the particulate matter amount in the exhaust based on capacitance between the pair of electrodes; and
   wherein a time rate of change of the capacitance between the pair of electrodes is used as the time rate of change of the particulate matter amount.

3. The control system according to claim 2, wherein the diagnostic device detects an exhaust gas temperature,
   wherein the abnormality of the sensor is determined by comparing a value, which is obtained by correcting the time rate of change of the capacitance between the pair of electrodes based on the detected exhaust gas temperature, with a predetermined rate-of-change threshold.

4. The control system according to claim 1,
   wherein the predetermined injection amount threshold is 0; and
   wherein the time rate of change of the particulate matter amount detected by the sensor at a fuel cut time is calculated when the fuel injection amount is 0.

5. The control system according to claim 1, wherein the period is any one of during decelerating, running downhill, or running by inertia in a vehicle.

* * * * *